United States Patent [19]

Brunner et al.

[11] Patent Number: 4,727,544
[45] Date of Patent: Feb. 23, 1988

[54] MEMORY INTEGRITY CHECKING SYSTEM FOR A GAMING DEVICE

[75] Inventors: Norman Brunner, Gurnee; Phillip Pajak, Western Springs; Douglas Hilgendorf, Gurnee; all of Ill.

[73] Assignee: Bally Manufacturing Corporation, Chicago, Ill.

[21] Appl. No.: 870,796

[22] Filed: Jun. 5, 1986

[51] Int. Cl.$^4$ .................. G06F 11/00; G01R 31/28
[52] U.S. Cl. .......................... 371/21; 371/25; 364/410
[58] Field of Search ............ 371/21, 25; 364/410, 364/200 MS File, 900 MS File

[56] References Cited

U.S. PATENT DOCUMENTS

| | | | |
|---|---|---|---|
| 3,838,264 | 9/1974 | Maker | 371/21 |
| 4,058,316 | 11/1977 | Miller | 371/20 X |
| 4,142,243 | 2/1979 | Bishop et al. | 364/900 |
| 4,355,390 | 10/1982 | Hellwig et al. | 371/21 |
| 4,519,077 | 5/1985 | Amin | 371/21 |
| 4,602,369 | 7/1986 | Murakami et al. | 371/25 |
| 4,646,307 | 2/1987 | Nishimura | 371/21 X |

Primary Examiner—Charles E. Atkinson
Attorney, Agent, or Firm—Jenner & Block

[57] ABSTRACT

A system for continuously checking the integrity of the memories of a computer controlled gaming device. The gaming device includes a plurality of EPROMs for storing software and fixed data according to which the gaming device operates. A checksum algorithm stored in one of the EPROMs is periodically implemented throughout the operation of the gaming device to calculate individual checksums for each EPROM. The checksum calculated for an EPROM is compared to a checksum value stored for that EPROM to determine whether changes in the contents of the memory have been made.

9 Claims, 5 Drawing Figures

MEMORY INTEGRITY CHECKING SYSTEM FOR A GAMING DEVICE

TECHNICAL FIELD

The present invention relates to a computer controlled gaming device having memories for storing game software and data and more particularly to a system for periodically checking the integrity of the memories of such a gaming device.

BACKGROUND OF THE INVENTION

Gaming devices are known which include a computer control and one or more memories for storing software and data. The operation of the gaming device and in particular winning plays and payouts is determined in accordance with the software and data stored in the device's memories. In order to provide fair games as well as to prevent unauthorized payouts, the integrity of the gaming device's memories must be maintained.

Known gaming devices have included memory integrity checking software which is impemented only when the device is powered up from an off state, or during diagnostic testing in which the gaming device is controlled by an authorized technician. Such software has been found inadequate in detecting unauthorized memory changes. More specifically, ways have been devised to change the memory of a computer controlled gaming device without causing the device to go into an off state. Because the memory is altered while the gaming device is powered, the changes to the memory are not detected by known memory integrity checking software routines.

SUMMARY OF THE INVENTION

In accordance with the present invention, the disadvantages of prior memory integrity checking systems for gaming devices, as discussed above, have been overcome. The memory integrity checking system of the present invention periodically implements memory check software to continuously monitor the integrity of the gaming device's memories.

The gaming device of the present invention includes a plurality of memories for storing software and fixed data and a processor for implementing the software to control the gaming device. One of the memories stores a checksum algorithm according to which individual checksums are calculated for each of the memories of the gaming device wherein the calculated checksums are based on the contents of the memories to determine whether an unauthorized change in the memories' contents has been made. Individual checksum values for each of the memories are also stored. The processor is controlled to periodically implement the checksum algorithm to calculate a checksum for each of the memories and to compare the calculated checksum for each memory with a respective, stored checksum value to determine whether any unauthorized change has been made. If it is determined that an unauthorized change in a memory's contents has been made, the processor locks up the gaming device to prevent further operation thereof.

For versatility in manufacturing gaming devices of the same general type, one of the memories of the device stores fixed data defining the personality of the particular gaming device, i.e. data defining the device as a 25¢ machine, $1.00 machine, etc. The personality memory may vary among gaming devices of the same general type but the other memories of each gaming device contain the same standard software. In order to maintain the versatility of such a gaming device, the memory integrity checking system of the present invention stores the checksum value for the personality memory in that memory; whereas, the checksum values for the other memories are stored in one or more of the memories containing the standard software. Because of this, when the personality memory is changed, the checksum for only that memory need be changed, while the other checksums remain unaltered.

These and other objects and advantages of the invention, as well as details of an illustrative embodiment, will be more fully understood from the following description and the drawings.

BEST MODE FOR CARRYING OUT THE INVENTION

Figure 1:
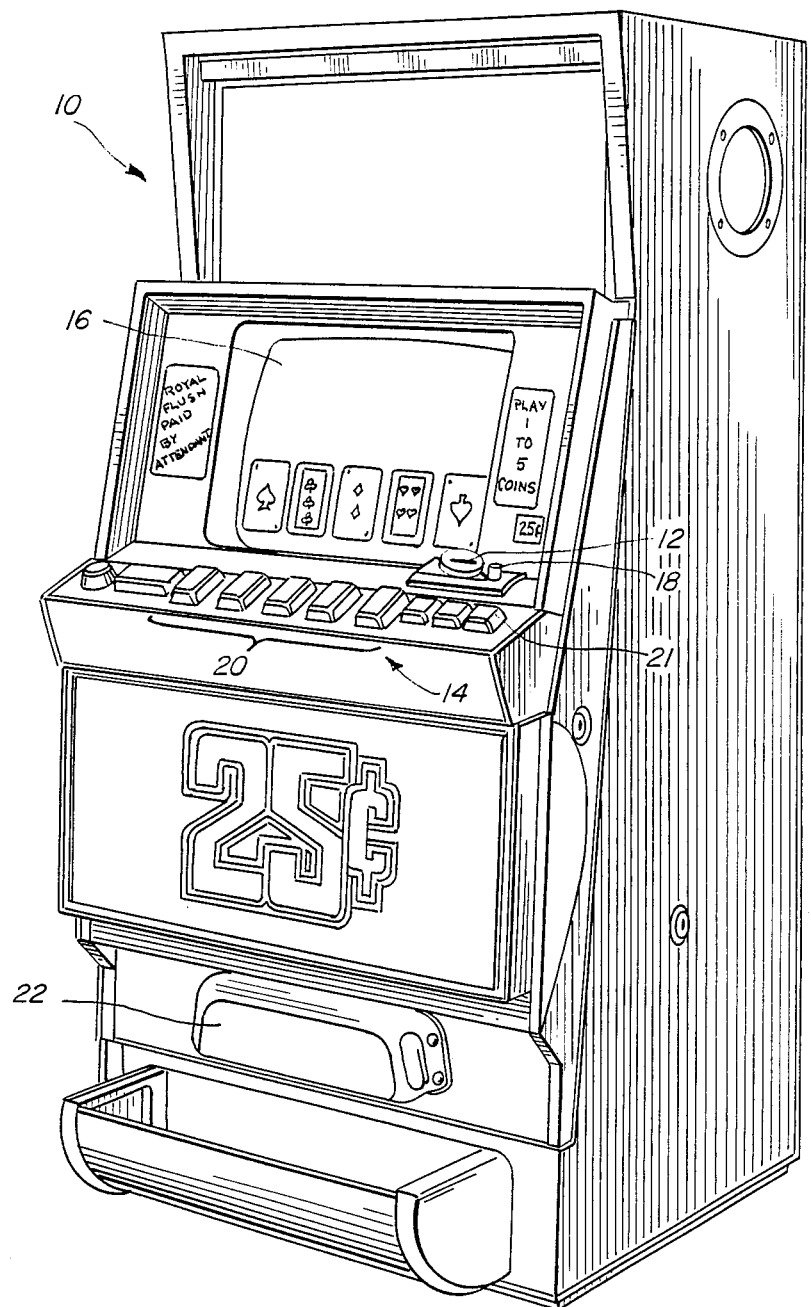
FIG. 1 is a perspective view of a gaming device employing the memory integrity checking system of the present invention.

A gaming device 10 which employs the memory integrity checking system of the present invention is shown in FIG. 1. As illustrated, the gaming device 10 is a 25¢ poker gaming machine having a coin slot 12 in which a player inserts a coin to initiate a poker game. The device 10 also includes a number of player input control keys or push buttons 14 and a CRT display 16 for providing video graphics to the player. When a player deposits a coin in the slot 12 and presses a start button 18, five cards are depicted on the CRT display 16, the cards constituting the player's poker hand. If the player wishes to hold a card which he is initially dealt, the player presses the hold button 20 associated with that card, there being an individual hold button associated with each of the five displayed cards. Thereafter, the player presses a deal button 21 which causes all of the cards not held to be discarded and new cards to be displayed in their stead. If the player has a winning hand, the gaming device pays out from a coin hopper, a number of coins through a payout chute 22.

Figure 2:
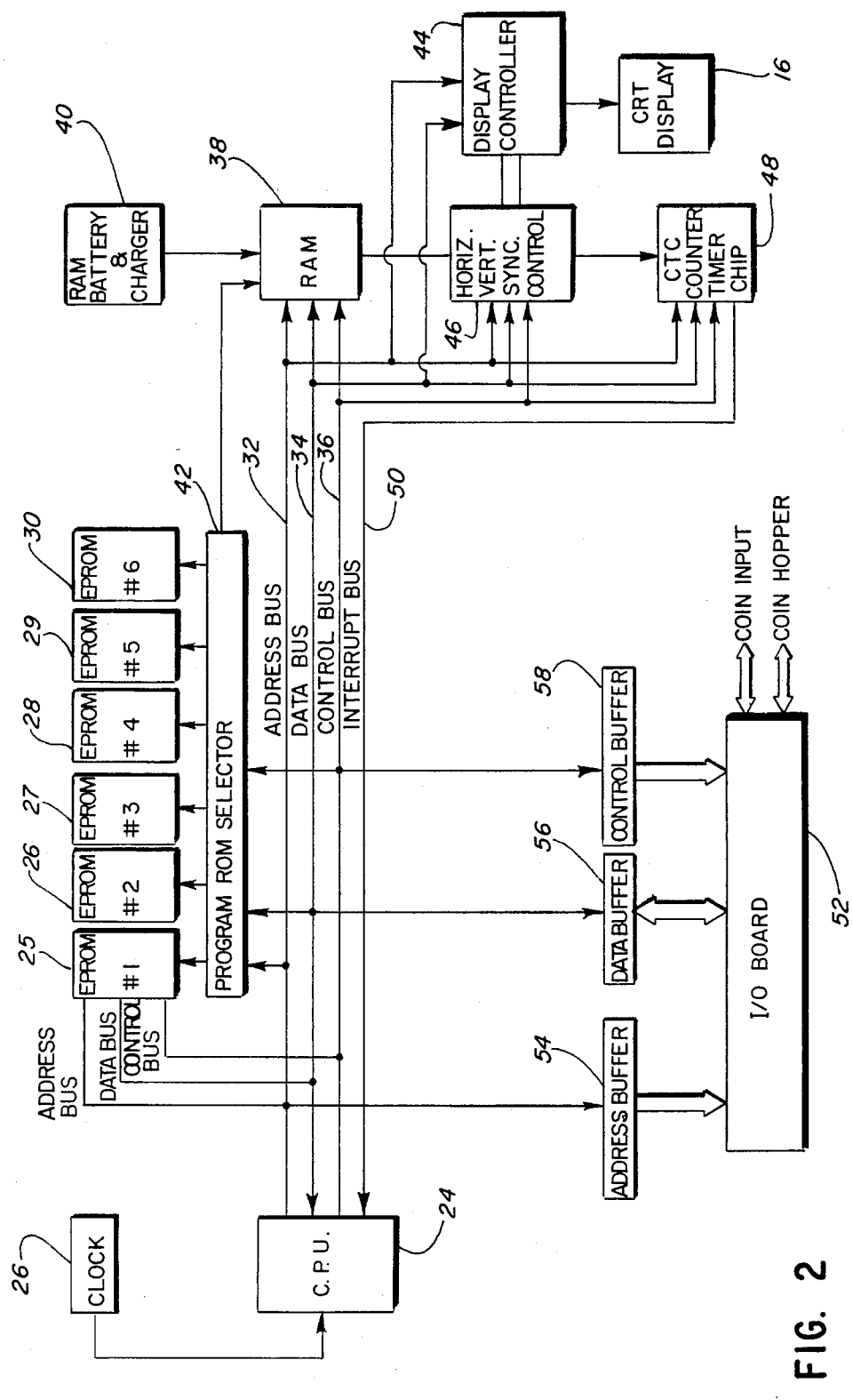
FIG. 2 is a block diagram of the gaming device of FIG. 1.

As shown in FIG. 2, the gaming device 10 includes a computer control system having a microprocessor 24 coupled to which is the system's clock 26. The microprocessor 24 is coupled to six EPROMs 25-30 through an address bus 32, data bus 34 and control bus 36. The EPROMs 25-30 store the software for the gaming device 10 as well as fixed data defining the nature of the game to be presented. One of the EPROMs, EPROM 30, stores data defining the personality of the gaming device. Such data may define the device 10 as a 25¢ poker game or a dollar poker game, for example, as well as defining a payout schedule. The gaming device 10 also includes a RAM 38 which provides a scratch pad memory for the system, the RAM being coupled to a back-up battery and charger circuit 40 to ensure that data stored in the RAM 38 is not lost upon a temporary power failure. A program ROM selector 42 is coupled between the address, data and control buses 32, 34 and 36 and the EPROMs 25-30 as well as the RAM 38 to select one of these memories in accordance with the processor 24. The microprocessor 24 controls the video graphics depicted on the CRT display 16 through a conventional display controller 44 and a horizontal/vertical sync. controller 46. A timing circuit 48 is coupled to the microprocessor 24 by the address, data and control buses 32, 34 and 36 as well as by an interrupt bus 50 to generate interrupts for the processor 24. When the microprocessor 24 receives an interrupt from the timing circuit 48, the processor reads and updates the input and output switches such as those for sensing the insertion of a coin into the slot 12. The processor 24 also controls the updating of the video color and background on the display 16 as well as updating various timers upon receipt of an interrupt. The processor 24 is coupled to an I/O board 52 through respective address, data and control buses 32, 34 and 36 and buffers 54, 56 and 58. The I/O board provides an interface between the processor 24 and the coin hopper, coin input mechanism, etc.

Figure 3:
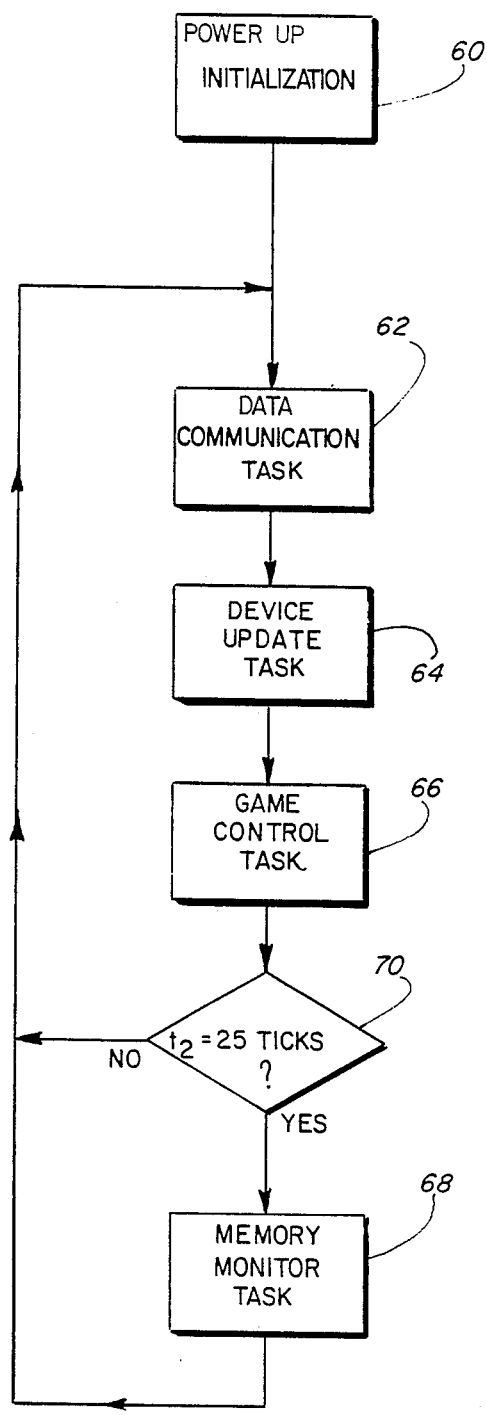
FIG. 3 is a flowchart illustrating the various tasks performed by the processor of the gaming device shown in FIG. 2.

As shown in FIG. 3, when the gaming device 10 is powered up, the microprocessor 24, at block 60, initializes the system and performs a complete checksum on all six EPROMs 25-30. If the processor 24 determines from the checksum that the contents of one of the EPROMs has changed, the processor locks up the gaming device 10 to prevent its operation. During the initialization of the system at block 60, the processor 24 further creates four additional tasks: a data communication task which is implemented by the processor 24 at block 62; a device update task implemented at block 64; a game control task which is implemented at block 66; and a memory monitor task which is implemented at block 68. The data communication task implemented by the processor 24 at block 62 controls communication with external devices such as a central computer to which a plurality of gaming devices may be coupled for communication therewith. The device update task implemented by the processor 24 at block 64 updates various output ports to, for example, enable or disable the coin input mechanism or to turn on or off the coin hopper. During the device update task at block 64, the processor 24 also updates the background and foreground information for the video display presentation provided on the CRT 16 based on the inputs to the gaming device as well as the current state of the gaming machine. The game control task implemented at block 66 by the processor 24 controls the processing of inputs to the gaming machine and further determines the state of the machine. The memory monitor task is implemented by the processor 24 at block 68 every 25 ticks, as determined by the processor 24 at block 70, wherein one tick is equal to 16 msec. During the memory monitor task, the processor 24 implements a checksum algorithm discussed in detail below with reference to FIG. 5 to check the integrity of each of the six EPROMs 25-30. If the checksum algorithm fails for one of the EPROMs, the gaming device 10 enters a tilt condition wherein an appropriate message is displayed on the CRT display 16 and the processor 24 locks up the machine so that coins cannot be accepted or paid out.

Figure 5:
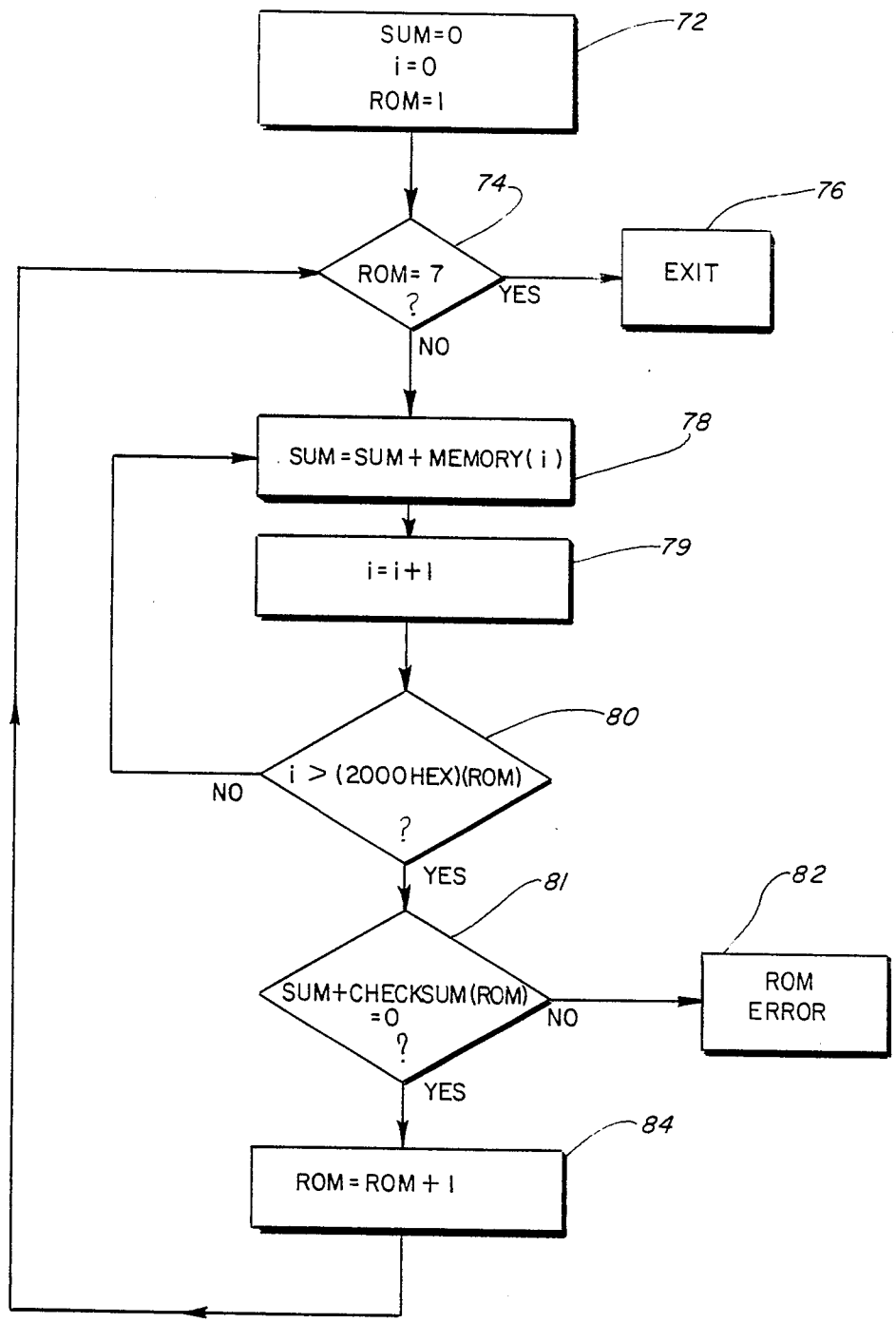
FIG. 5 is a flowchart illustrating a checksum algorithm for use in the memory integrity checking system of the present invention.

The checksum algorithm illustrated in FIG. 5 and implemented during the memory monitor task at block 68 is stored in one of the EPROMs 25-29. The processor 24, operating according to the algorithm, implements the following equation for each of the EPROMs:

$$\text{CHECKSUM} = \sum_i \text{CHECKSUM} + \text{MEMORY}[i]$$

where MEMORY [i] represents the content of the ith memory location in the EPROM for which the CHECKSUM is being calculated, i going from the first memory location in the EPROM to the last location in the EPROM. After calculating the checksum for an EPROM, the processor 24 compares the calculated checksum to a checksum value stored in that memory or another memory to determine if the contents of the EPROM have been changed or not. If a change is detected, the processor locks up the gaming device 10 to prevent further operation.

Figure 4:
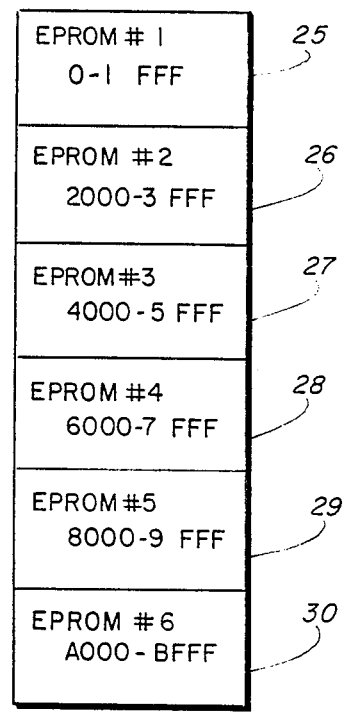
FIG. 4 is a memory map of the EPROMs for the gaming device shown in FIG. 2.

Upon entering the checksum algorithm routine, the processor 24, at block 72, sets the variables "SUM" and "i" equal to 0 and the variable, "ROM", equal to 1, where "SUM" represents CHECKSUM in the above equation and "ROM" represents the EPROM for which the checksum is being calculated, i.e. "ROM"=1 for EPROM 25; "ROM"=2 for EPROM 26; "ROM"=3 for EPROM 27; "ROM"=4 for EPROM 28; "ROM"=5 for EPROM 29; and "ROM"=6 for EPROM 30. At block 74, the processor 24 determines whether the variable "ROM" is equal to 7 indicating that a checksum has been calculated for each of the six EPROMs 25-30. If the variable "ROM" is equal to 7, the processor exits from the checksum algorithm at block 76 and if not, the processor 24 continues at block 78. At block 78, the processor calculates the following equation: SUM=SUM+MEMORY [i]. After calculating the variable "SUM" at block 78, the processor increments i at block 79 to be equal to the current value of i plus one. At block 80, the processor determines whether i is greater than 2000 hex times the value of the variable, "ROM". If it is not, the processor returns to block 78 to calculate the next value of "SUM" for the value of i previously calculated at block 79. The loop through blocks 78, 79 and 80 continues until i is greater than 2000 Hex times the EPROM number as determined at block 80 to implement the equation:

$$\text{CHECKSUM} = \sum_i \text{CHECKSUM} + \text{MEMORY}[i].$$

for each EPROM, where, as shown in FIG. 4, i goes from 0 to 1FFF Hex to calculate the checksum for the first EPROM 25; i goes from 2000 Hex to 3FFF Hex for the second EPROM 26; i goes from 4000 Hex to 5FFF Hex for the third EPROM 27; i goes from 6000 Hex to 7FFF Hex for the fourth EPROM 28; i goes from 8000 Hex to 9FFF Hex for the fifth EPROM 29; and i goes from A000 Hex to BFFF Hex for the sixth EPROM 30.

When the variable "ROM" is equal to one and i is greater than 2000 Hex, indicating that the checksum, "SUM", for the first ROM 25 has been calculated, the processor 24 goes from block 80 to a block 81 to determine whether any changes have been made to the contents of the first EPROM 25. The processor 24 determines this by comparing the value "SUM" calculated at block 78 to the checksum value, CHECKSUM [ROM] for the first EPROM 25 which may be stored in any one of the EPROMs 25-29. The checksum value stored for the EPROM 25 as well as the individual checksum values for each of the other EPROMs 26-30 is the two's complement of the value "SUM" calculated for an unaltered memory. If no changes have been made to the first EPROM 25, then the value "SUM" calculated at block 78 when added at block 81 to the checksum value stored for the EPROM 25 will equal 0. If SUM+CHECKSUM [ROM] as determined at block 81 does not equal 0, the processor 24, at block 82 determines that an error has occurred and locks up the gaming device 10 to prevent further operation. If it is determined at block 81 that SUM+CHECKSUM [ROM] is equal to 0 the processor 24, at block 84, increments the variable "ROM" to be equal to the current EPROM number, "ROM", plus one. So that after calculating the checksum for the first EPROM 25, at block 84, the processor 24 sets the variable "ROM" equal to 2. From block 84, the processor 24 returns to block 74 to calculate "SUM" at block 78 for the second EPROM 26 and at block 81 determines whether SUM+CHECKSUM [EPROM 2]=0. The processor 24 continues to loop through blocks 78 through 84 until an error is detected or the variable "ROM" has been incremented to 7 at which time the processor 24 exits the checksum algorithm routine at block 76. In order to allow authorized changes to be made to the personality ROM 30 without changing the checksum values for any of the other memories, the checksum value for the sixth EPROM 30 is stored in the EPROM 30 whereas the checksum values for the EPROMs 25-29 may be stored in any one of the EPROMs 25-29.

The memory integrity check provided by the checksum algorithm routine of the memory monitor task 68 allows the integrity of each of the EPROMs 25-30 to be checked periodically, specifically every 400 msec., so that the integrity of the gaming device is checked continuously throughout the operation of the device 10. Because individual checksums are calculated for each of the EPROMs 25-30, the memory integrity checking system of the present invention can determine which of the individual EPROMs has been altered. Further, because the checksum value for the personality EPROM 30 is stored in that EPROM, the contents of the personality ROM 30 may be changed without necessitating the recalculation of the checksums for each of the EPROMs 25-29 thus maintaining the versatility of the memory configuration for the gaming system.

It is noted that any type of checksum algorithm may be used in the present invention where the result of the algorithm is unique and reproducible and may be represented as $$\text{CHECKSUM RESULT} = \sum_i F(x_i)$$

where $x_i$ represents a data group such as a byte of data stored at the ith location in the memory where i goes from the first storage location to the last location in the memory.

We claim:

1. In a gaming device operable to present a game of a fixed nature, a system for continuously monitoring the integrity of the gaming device comprising:
   processing means under the control of a stored fixed program, and stored fixed data defining the nature of the game to be presented, for controlling the operation of the gaming device;
   fixed memory means for storing said fixed program, said fixed data, a checksum algorithm according to which a checksum is calculated for said fixed memory means, and a checksum value for said memory means, said checksum being based on the contents of the fixed memory means to determine whether an unauthorized change in said contents has been made; and
   means for controlling said processing means to periodically implement said checksum algorithm to calculate a checksum for said fixed memory means and to compare the calculated checksum for said fixed memory means with the checksum value stored to determine whether an unauthorized change has been made;
   said processing means being responsive to a determination that an unauthorized change in the contents of said memory mean's has been made to prevent further operation of the gaming device.

2. The gaming device of claim 1 wherein said fixed memory means is a read only memory.

3. In a gaming device operable to present a game of a fixed nature, a system for continuously monitoring the integrity of the gaming device comprising:
   processing means under the control of a stored fixed program, and stored fixed data defining the nature of the game to be presented, for controlling the operation of the gaming device;
   a first fixed memory for storing said fixed program, a checksum value for said first fixed memory and a checksum algorithm according to which an individual checksum is calculated for a fixed memory based on the contents of the fixed memory to determine whether an unauthorized change in the fixed memory's contents has been made;
   a second fixed memory for storing data defining the personality of the gaming device and a checksum value for said second memory; and
   means for controlling said processing means to periodically implement said checksum algorithm to calculate a checksum for said first and second fixed memories and to compare the calculated checksum for the first and second fixed memories to the respective checksum values stored in said first and second fixed memories to determine whether an unauthorized change has been made to either of said fixed memories.

4. The gaming device of claim 3 wherein said first and second memories are read only memories.

5. In a gaming device operable to present a game to a user thereof, a system for continuously monitoring the integrity of the gaming device comprising:
   processing means under the control of a stored program, and stored data defining the nature of the game to be presented, for controlling the operation of the gaming device;
   a first read only memory for storing said data defining the personality of the gaming device, and a checksum value for said first read only memory;
   a plurality of additional read only memories for storing said program, a checksum algorithm for implementation by said processing means, said algorithm, when implemented, controlling said processing means to calculate an individual checksum for each of said read only memories based on the contents of the memory, and a plurality of checksum values each value being associated with a particular additional read only memory and being related to the checksum expected to result from the implementation of said algorithm, said checksum values for each additional memory being stored in one or more of said additional read only memories; and means for controlling said processing means to periodically implement said checksum algorithm to calculate a checksum for said first read only memory and for each of said additional read only memories and to compare the calculated checksum for each memory to the respective checksum value stored for the memory to determine whether an unauthorized change has been made in the contents of any of the memories.

6. The gaming device of claim 5 further including means for controlling said processing means to prevent further operation of said gaming device in response to a determination that an unauthorized change has been made.

7. In a gaming device operable to present a game to a user thereof, a system for continuously monitoring the integrity of the gaming device comprising:

processing means under the control of a stored program, and stored data defining the personality of the game to be presented, for controlling the operation of the gaming device;

a first read only memory for storing said data defining the personality of the gaming device and an integrity check value for said first read only memory;

a plurality of additional read only memories for storing said program, an algorithm for checking the integrity of a memory which stores information in groups to determine whether an unauthorized change in the memory's contents has been made, said algorithm including a function which acts on every group in the memory to provide a unique and reproducible result, and a plurality of integrity check values each value associated with one of said additional memories and being related to the algorithm result expected for its associated memory, the integrity check value for each additional memory being stored in one or more of said additional memories; and means for controlling said processing means to periodically implement said algorithm for each of said memories and to compare the algorithm result for each memory to the stored algorithm integrity check value to determine whether an unauthorized change has been made.

8. The gaming device of claim 7 wherein said memories are read only memories.

9. The gaming device of claim 7 further including means for controlling said processing means to prevent further operation of the gaming device in response to a determination that an unauthorized change has been made.

* * * * *